United States Patent [19]

Sayer et al.

[11] 4,009,609
[45] Mar. 1, 1977

[54] METHOD AND APPARATUS FOR TESTING A SUBSURFACE FORMATION FOR FLUID RETENTION POTENTIAL

[76] Inventors: Wayne L. Sayer, 1755 Trinity, No. 12, Walnut Creek, Calif. 94596; Pat Wright, 1967 Desert Circle, Apt. No. 8, Walnut Creek, Calif. 94598

[22] Filed: Aug. 15, 1975

[21] Appl. No.: 605,213

[52] U.S. Cl. ............................ 73/155; 73/152
[51] Int. Cl.² .............................. G01V 9/00
[58] Field of Search ............... 73/155, 152, 154

[56] References Cited

UNITED STATES PATENTS

| | | | |
|---|---|---|---|
| 2,137,985 | 11/1938 | Salvatori | 73/152 |
| 2,172,625 | 9/1939 | Schlumberger | 73/152 |
| 2,739,475 | 3/1956 | Nowak | 73/152 |
| 3,480,079 | 11/1969 | Guinn et al. | 73/154 |
| 3,690,164 | 9/1972 | Gabillard et al. | 73/152 |
| 3,795,142 | 3/1974 | Smith et al. | 73/154 |

*Primary Examiner*—James J. Gill
*Assistant Examiner*—Anthony V. Ciarlante
*Attorney, Agent, or Firm*—Huebner & Worrel

[57] ABSTRACT

A method and apparatus for testing a subsurface formation for the retention of a fluid where energy is passed through the formation, including inserting a test fluid into the formation in the path of the energy, the test fluid having properties of mobility corresponding to those of the fluid to be retained and properties affecting in a detectable manner the energy passed through the test fluid in the formation; and sensing the energy affected by passage through the test fluid in the formation to determine the retention potential of the formation.

12 Claims, 4 Drawing Figures

METHOD AND APPARATUS FOR TESTING A SUBSURFACE FORMATION FOR FLUID RETENTION POTENTIAL

BACKGROUND OF THE INVENTION

1. Field Of The Invention

The present invention relates to a method and apparatus for testing a subsurface formation for fluid retention potential and more particularly to such a method and apparatus which are particularly well suited to the location and evaluation of porous subsurface formations having impervious overlaying structures forming downwardly facing pockets capable of capturing and retaining natural gas supplied to the porous formation until needed.

2. Description Of The Prior Art

The prior art is typified by such U.S. patents as the Allen U.S. Pat. No. 3,062,012; the Palmer U.S. Pat. No. 3,114,256; the Prats U.S. Pat. No. 3,604,256; the Kuo et al U.S. Pat. No. 3,636,762; the Chase, Jr. et al. U.S. Pat. No. 3,690,167; and the Prats U.S. Pat. No. 3,711,360. These patents relate primarily to methods and apparatus for studying, for various purposes, the structure and characteristics of rock and soil formations.

Applicant Sayer's U.S. Pat. No. 3,805,587 and currently pending U.S. patent application, Ser. No. 507,275, filed Sept. 19, 1974, and applicants Sayer and Wright's currently pending U.S. patent application, Ser. No. 422,319, filed Dec. 3, 1973, relate to various methods and apparatus useful in the location and evaluation of geothermal sources of energy.

It is known in the prior art to store natural gas in porous subsurface formations captured by interfacing overlaying impervious structures. Such natural gas may be that derived from oil wells and returned to the earth for later recovery and use. It is also known to store natural gas in subsurface formations adjacent to industrial and metropolitan areas for later recovery during periods of need such as during the winter months. Such subsurface storage has a myriad of advantages over the surface storage of natural gas. Where a suitable formation is located, elaborate and expensive surface storage facilities need not be constructed and maintained. The hazards of explosion and fire are considerably reduced. Once a suitable formation is located, it can be used repeatedly and virtually indefinitely with very little maintenance and in many cases with a storage capacity of virtually unlimited proportions for all practical purposes.

However, the primary difficulty with such subsurface storage of natural gas is the difficulty in locating formations of suitable structure. The porosity and permeability of the formation may not be sufficient to accommodate the injection and extraction of natural gas. The size of the porous formation may not be sufficient for storage purposes. The overlaying interface may, itself, be so porous as to permit natural gas to bleed off over a period of time. Similarly, the subsurface formation may allow the natural gas to leak into sewer systems, basements and the like so as to constitute an explosion and fire hazard. The interface may not be sufficiently vaulted, or in other words, may not have downwardly facing pockets of sufficient capacity to entrap the natural gas for subsequent extraction. There may also be subsurface bodies of water or steam which may carry away or dissipate the natural gas. Similarly, there may be substances in the formation or adjacent to the formation which contaminate the natural gas so as to make it unfit for later use.

For all of these reasons, it is necessary to test a likely formation for its potential to retain natural gas prior to injecting substantial quantities of the natural gas into the formation. Conventionally, the only method of which the applicants are aware for accomplishing this operation is to drill a borehole into the formation; pump a given quantity of natural gas into the formation; drill a plurality of boreholes laterally of the main borehole into the formation; and test the formation through the plurality of lateral boreholes in an attempt to determine the location, dissipation and size of the quantity of natural gas.

This method is of little practical value. Because of the extreme expense involved in drilling boreholes, particularly where great depths are involved, such conventional approaches have been practical only in a very few instances. Even where the method is employed, the test results are of necessity superficial due to the impracticality of drilling the considerable number of boreholes which is required to obtain a clear indication of the position, size and concentration of the natural gas within the formation. Furthermore, the existence of the plurality of boreholes themselves allows the natural gas to escape from the formation thereby distorting any test results obtained. Thus, in the vast majority of instances, the possibility of such subsurface storage is simply not pursued. This frequently results, in the case of the drilling of oil wells, in the illegal release of the unwanted natural gas into the atmosphere or the discarding of the gas by burning.

Therefore, it has long been known that it would be desirable to have a method and apparatus for testing subsurface formations for fluid retention potential which can be employed to determine the characteristics of the subsurface formation and its suitability to the storage of fluids such as natural gas over prolonged periods of time for recovery when required and to have such a method and apparatus which can be employed at only a small fraction of the expense of conventional methods and apparatus with a reliability and efficiency fully acceptable to adoption as routine practice.

SUMMARY OF THE INVENTION

Therefore, it is an object of the present invention to provide an improved method and apparatus for testing a subsurface formation for fluid retention potential.

Another object is to provide such a method and apparatus which is particularly well suited to the location and evaluation of a subsurface formation for the storage of natural gas insuring that it is available for recovery when needed.

Another object is to provide such a method and apparatus which make economically feasible the storage of natural gas in subterranean formations adjacent to industrial and metropolitan areas for use when required, such as during winter months.

Another object is to provide such a method and apparatus which permit natural gas to be stored when available and to be used when needed.

Another object is to provide such a method and apparatus which reduce the temptation for natural gas recovered from oil wells to be released into the atmosphere or burned because of the difficulty and expense of storage.

Another object is to provide such a method and apparatus which permit natural gas to be stored at comparatively low cost and without the necessity of constructing expensive and elaborate surface storage facilities which are also expensive to maintain and constitute a hazard as a result of the danger of explosion and fire.

Another object is to provide such a method and apparatus which allow the monitoring of a test gas injected into a likely formation so as to find the optimum location for natural gas storage in the formation even though that optimum location proves to be a considerable distance from the actual point of injection into the formation.

Another object is to provide such a method and apparatus which affords a flexibility of use providing a plurality of techniques for detecting and cross checking data acquired in the practice of the method of the present invention utilizing the apparatus.

Further objects and advantages are to provide improved elements and arrangements thereof in an apparatus for the purposes described which is dependable, economical, durable and fully effective in accomplishing its intended purposes.

DESCRIPTION OF THE PREFERRED EMBODIMENT

Figure 1:
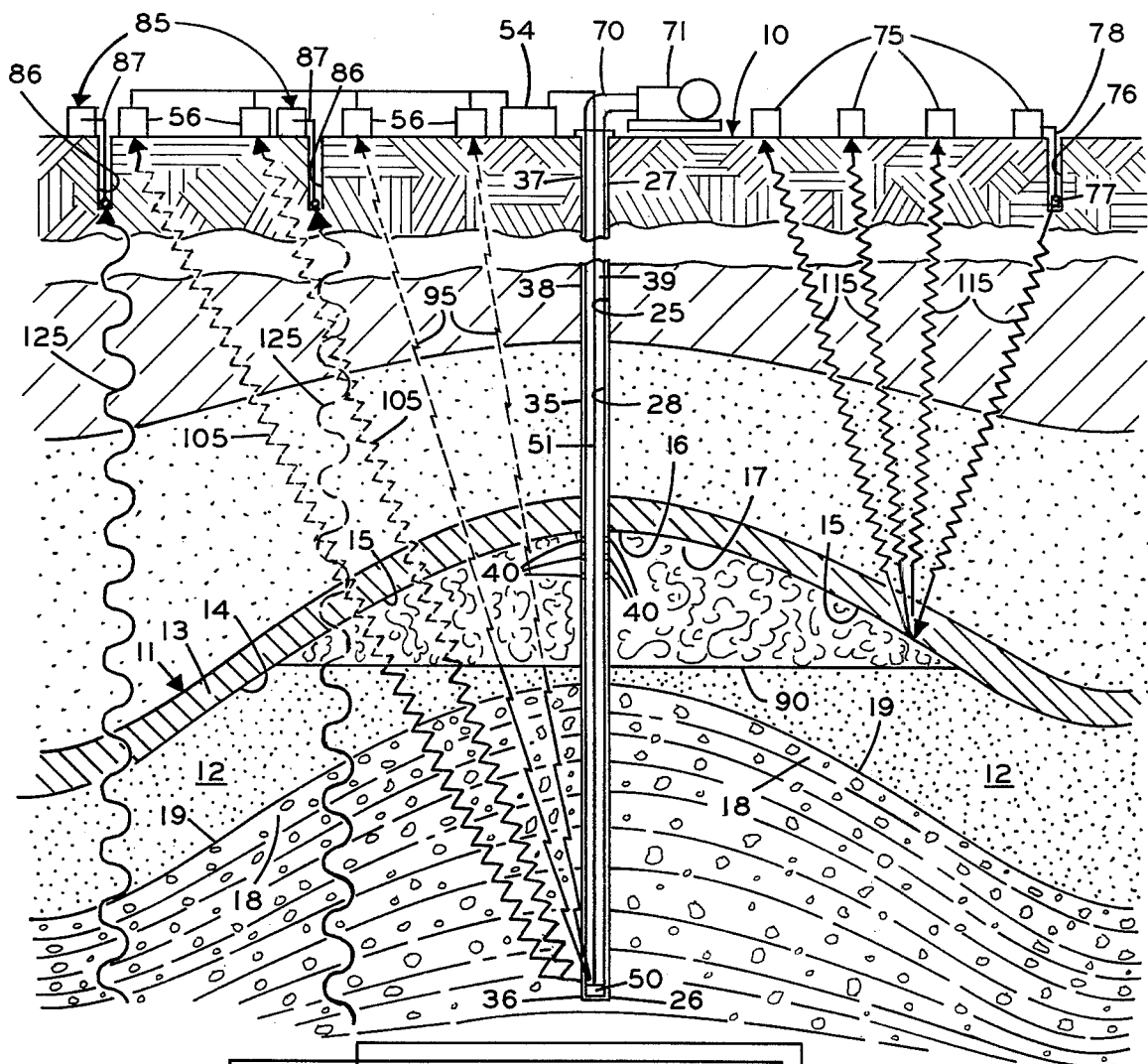
FIG. 1 is a fragmentary vertical section of a portion of the earth in which the apparatus of the present invention is mounted and illustrating the practice of the method of the present invention.

Referring more particularly to the drawings, the earth's surface is indicated at 10. A plurality of layered subsurface formations have been shown in FIGS. 1 and 3 for illustrative convenience beneath the earth's surface. It will be recognized, of course, that a variety of types and configurations of subsurface formations may be encountered in the practice of the method of the present invention. Those formations shown in the drawings were selected merely for purposes of illustrating the method and apparatus of the present invention.

Figure 3:
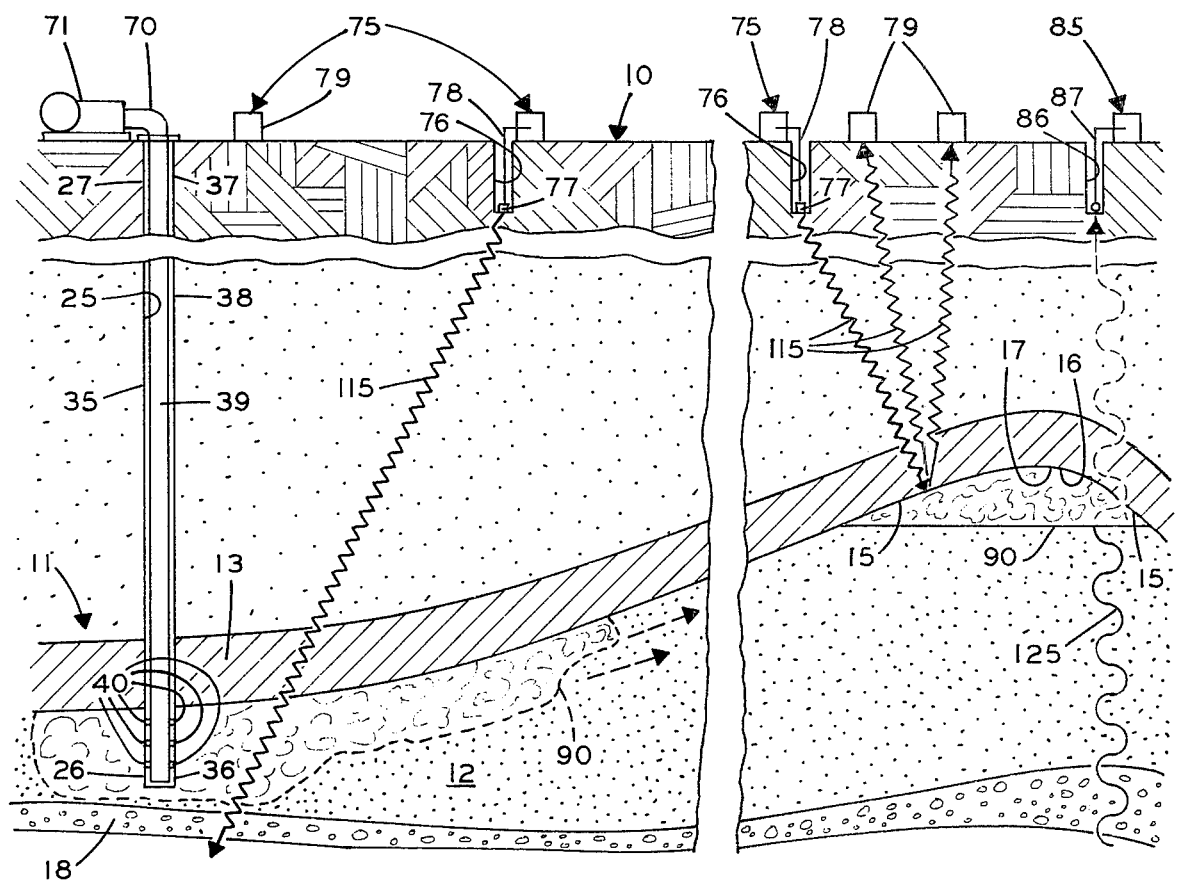
FIG. 3 is a fragmentary vertical section of a portion of the earth showing the apparatus of the present invention mounted in the earth and on the earth's surface illustrating the use of the method under conditions varying from those of FIG. 1.

A subsurface formation 11, as shown in FIGS. 1 and 3 in different circumstances, is intended to represent a formation determined by procedures hereinafter to be described possibly to possess those attributes suitable for fluid storage. The subsurface formation 11 is composed of a porous formation 12 and a substantially impervious overlying structure 13. The porous formation, where suitable for a fluid storage, may be composed of sand, a similar permeable particulate matter, fractured rock strata or the like, or may simply be a subterranean cavern. The overlaying structure can also, of course, be of a variety of types and configurations such as that composed of rock strata impervious to the passage of fluid therethrough.

The overlaying structure 13 engages the porous formation 12 at interface 14 having a generally vaulted configuration as shown in FIGS. 1 and 3. The overlaying structure at the interface has convergently upwardly sloping portions 15 interconnected by a continuous cap portion 16. It will be seen that where the formation 11 is of a configuration suitable for fluid storage, the sloping portions and cap portion along the interface will normally, but not always, be of a roughly inverted concave configuration. The sloping and cap portions of the overlaying structure thus form a downwardly facing pocket 17 along the interface. An underlying structure 18 forms a lower boundary for the porous formation 12 engaging the formation along an interface 19.

Figure 2:
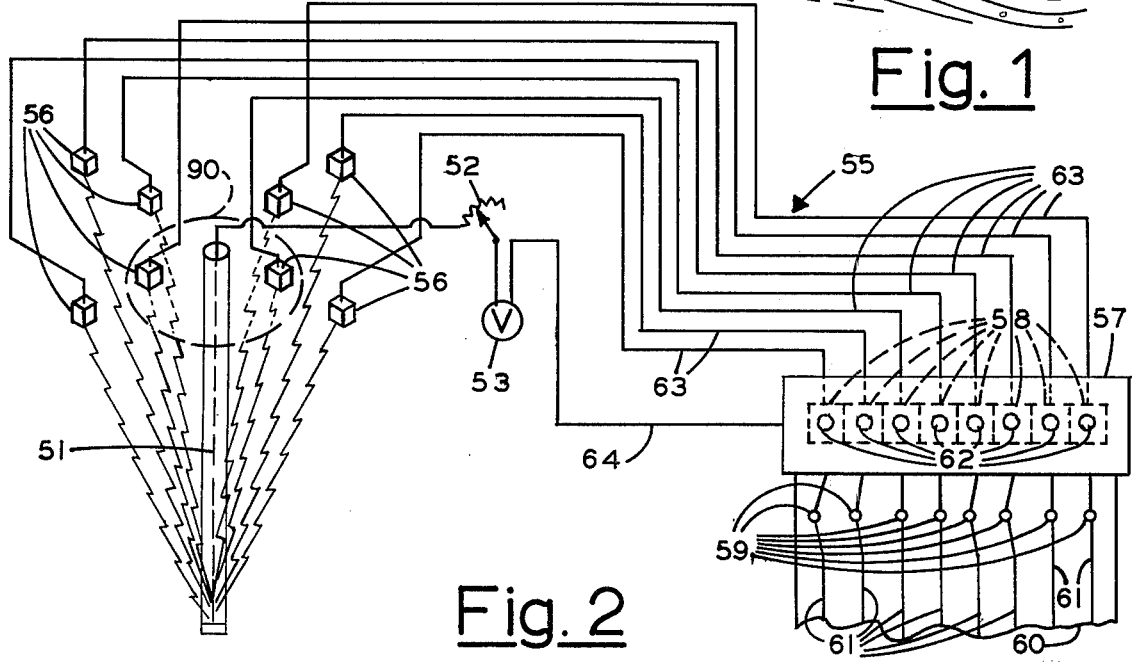
FIG. 2 is a schematic diagram of an electrical circuit and recording equipment constituting part of the apparatus of the present invention used in the practice of the method hereof.

The initial location of a subsurface formation 11 which appears to be a likely prospect for fluid storage may result from a variety of circumstances. For example, adjacent to the site of an oil well, there may be existing nonproductive or "dry" borehole. Such a borehole may provide a convenient location for the disposal of natural gas recovered from the oil well if a suitable subsurface formation with which the borehole communicates can be located. Thus, the method and apparatus of the present invention, in the case of this example, can be employed, as will be seen, to determine if there is such a formation with which the borehole communicates. In other circumstances, there may be an abandoned borehole in the vicinity of an industrial or metropolitan area upon which records are in existence which may appear to indicate that a suitable formation for fluid storage is present. A still further situation may be one in which existing records of past geological surveys in a given area indicate the possible existence of such a suitable formation. Where no existing information or available boreholes are in existence, new geological surveys can be conducted using conventional methods and equipment in an attempt to find a suitable subsurface formation for fluid storage adjacent to the location where the fluid is needed.

Where no boreholes are in existence in the area where the storage of the fluid is desired, the method of the present invention calls for the drilling of a borehole, such as borehole 25, shown in FIGS. 1 and 3, at the point indicated by geological surveys to be the most promising and likely site. Of course, if the geological surveys indicate a formation at a specific depth, the goal of the drilling operation will be to reach that formation at the given depth. However, during the drilling of the borehole, the cuttings and residue produced by the drilling operation are evaluated using conventional techniques to guide the operators toward the formation and to continue to evaluate the likelihood of success in reaching a suitable formation. Additionally, core samples can be taken during this process to further assist the operators. The depth of the borehole can, of course, vary greatly depending upon the exact location of the formation. However, the borehole will frequently extend from 2,500 feet to 5,000 feet below the earth's surface 10. Analysis of the cuttings from the boring operation and of core samples taken from the borehole will confirm when the subsurface formation 11 to be tested has been reached. As shown in FIGS. 1 and 3, the borehole 25 has a remote end 26, an upper end 27 and a side wall 28 to which reference will be made. The borehole can be drilled to a depth sufficient simply to spective recording units 58 for the transmission of electrical energy therebetween. Thus, the test energy detected by the detecting devices 56 is transmitted as a signal along the electric conductors in the form of electrical energy to their respective recording units. The recording units are connected to the source of electrical energy 53 by electrical conductor 64, as shown in FIG. 2. The voltage regulator 52 is adapted to be adjusted to vary the voltage of or terminate the flow of current from the source 53 through the conductor 51 to the discharging device 50 at the remote end 26 of the borehole 25.

Whether or not the test energy discharging device 50 and detecting and recording equipment 55 are employed as previously set forth, a well head 70 is preferably mounted on the upper end 37 of the casing 35 so as to seal the interior 39 of the casing. Where the discharging device 50 is employed, the electric conductor 51 is extended through the well head, as shown in FIG. 1. A pump 71, connected to a source of a test fluid of any one of a variety of compositions subsequently to be discussed, is mounted at the earth's surface 10 in connection with the well head 70 and operable to pump the test fluid through the well head and into the interior 39 of the casing 35.

The method of the present invention calls for the use of a variety of other devices in addition to or in place of the test energy discharging device 50 and sensing equipment 55. As previously noted, the determination of whether all, a combination, or only one type of device will be employed is dependent upon the information already known about the subsurface formation 11, the availability of the devices, the economic limitations, the preferences of the operators, conditions which develop during the testing, and the like. Because of the comparative ease with which some such additional devices can be employed and the resulting difference in expense, the use of one or more of these additional devices may be preferable to the discharging device 50 and sensing equipment 55, the installation of which has already been described.

Sonic or seismic equipment 75, hereinafter to be referred to as seismic equipment, capable of discharging sound or compression waves into the earth and registering the reflection of the waves from subsurface features is indicated at 75 in FIG. 1. These devices can be of a variety of types. The equipment 75 which is shown in the drawings was selected merely for illustrative convenience. The type shown employs a borehole 76 which is formed in the earth at a selected location with respect to the subsurface formation 11 and an explosive charge 77 is deposited in the borehole. A detonating assembly 78 is connected to the charge for detonation of the charge upon command. The equipment further includes a plurality of detecting or sensing devices 79, such as geophones, which are positioned in a selected array on the earth's surface 10 in position to detect sound or compression waves produced by detonation of the charge and reflected from the formation in the practice of the method hereof. As with the sensing equipment 55, the equipment 75 preferably includes a recording device, not shown, for producing a physical record, such as a strip chart, for subsequent analysis.

The method and apparatus further include the use of temperature recording equipment 85 adapted to sense and record temperatures in the earth resulting from geothermal heat flux transmitted upwardly through the earth. The equipment 85 can be employed individually or in any combination with the other equipment 55 and 75. Equipment of this type also takes a variety of forms. Normally, however, the temperature readings must be taken at a sufficient depth, such as for example 100 feet, below the earth's surface 10 to overcome the effect of ambient or surface temperatures transmitted into the earth. For illustrative convenience, as shown in FIG. 1, the equipment 85 includes a plurality of boreholes 86 which are formed in the earth to a depth sufficient to overcome the ambient surface temperatures. The equipment 85 further includes a sensing and recording apparatus 87 extending from the remote end of each of the boreholes to the earth's surface. As stated with respect to equipment 55 and 75, the equipment 85 preferably further includes equipment, not shown, for producing a physical record of the recorded readings.

After the assembly and arrangement of the equipment 55, 75 and/or 85 as described above, various test readings can be taken, using the equipment to establish a model useful in evaluating the data acquired in the subsequent steps of the method. The actual operation of the equipment will be described subsequently. However, the operation before, during and after injection of a test fluid into the porous formation 12 is substantially identical except for the effect produced by the test fluid.

The method of the present invention next calls for the pressurization of the interior 39 of the casing 35 with a test fluid using the pump 71. The test fluid should have characteristics of permeability and mobility closely similar to those of the fluid which will be stored in the formation 11 if it proves to be suitable for the purpose. As previously stated, the method and apparatus are believed to be particularly well suited to use where the fluid to be stored is to be natural gas. Of course, a quantity of natural gas itself can be employed as the test gas in this case. However, the risk that the gas will seep into adjacent areas and constitute an explosion and fire hazard makes this unwise until the retention potential of the formation 11 is determined. The test gas in this case is preferably an inert, non-condensible gas of low absorbability such as nitrogen, argon, krypton, or helium. Other test gases which might conditionally alternatively be employed are freon, carbon dioxide and sulfur dioxide. For the purposes of further discussion and illustrative convenience, it will be assumed from hereon that the test fluid employed is a gas. Of course, if the fluid to be stored is a liquid, it or a comparable liquid is employed for test purposes.

Pressurization of the interior of the casing by the pump 71 causes the test gas to be injected into the porous formation 12 of the subsurface formation 11 through the perforations 40 in the casing 35. The volume of gas injected into the porous formation 12 of the subsurface formation 11 through the perforations 40 in the casing 35. The volume of gas injected into the porous formation depends upon the structure and characteristics of the porous formation and upon the quantity of natural gas desired to be stored in the porous formation if it proves, as a result of the practice of the method of the present invention, to be suitable for this purpose. It may prove desirable to inject several thousand to several million cubic feet of test gas into the formation for this purpose.

As previously noted, it is generally advisable to operate the equipment 55, 75 and 85 prior to injection of the test gas into the formation 12. Similarly, such test position the remote end 26 thereof in communication with the porous formation 12 as shown in FIG. 3 or, alternatively, may be drilled to position the remote end below the porous formation a predetermined distance within the underlying structure 18 as shown in FIG. 1.

Subsequent to drilling of the borehole 25, the method of the present invention calls for taking appropriate geological logs within the borehole as may be indicated by the conditions encountered. As previously noted, some logging is done during the drilling operation itself such as driller's logging, core logging and cuttings-analysis logging. Other types of logging can be performed during or subsequent to the drilling operation as the operator prefers and as indicated by the conditions encountered. Among the other types of logging which may be used are visual wall logging, borehole camera logging, directional surveying, electric well logging, radio active logging, and the like. The results of these various logging techniques can then be evaluated to determine the characteristics of the formation. Normally, it is desirable to determine the depth of the portion of the borehole which communicates with the porous formation 12. It is also advantageous to determine the upper and lower boundaries of the porous formation at their intersection with the borehole or, in other words, the depths of interfaces 14 and 19 below the earth's surface 10, as well as any other characteristics which can be determined.

Once the determinable characteristics of the subsurface formation 11 have been established, the next step of the method is reached. Although in some instances it may be unnecessary to do so, it is generally advisable and good practice to mount a casing 35 within the borehole 25. The casing is preferably insulated against the conduction of electrical energy and/or sound or compression waves depending upon the test energy to be employed. As directed by conventional practice, the casing is usually cemented into position extending from the upper end 27 to the remote end 26 of the borehole. The casing itself has a remote end 36 and an upper end 37. The casing has a cylindrical side wall 38 confining an interior 39.

Subsequently, where a casing 35 is employed, the side wall 38 of the casing is perforated, using a suitable device such as a perforating gun, to form a plurality of holes or perforations 40, at the depth in the borehole 25 which has been determined by well logging techniques to communicate with the porous formation 12 of the subsurface formation 11. Normally, the perforations are formed in the casing adjacent to interface 14, as best shown in FIG. 1. Thus, communication is established between the interior 39 of the casing 35 and the porous formation 12.

From this point on, the practice of the method of the present invention may vary to some extent depending upon the known information regarding the subsurface formation 11, the preferences of the operator, the availability of equipment, the depth of the subsurface formation and the like. All of the detection techniques illustrated in FIG. 1 and hereinafter to be described, or any one or a combination of the techniques can be employed.

Where test energy is to be discharged from the remote end 36 of the casing 35, the next step in the practice of the method calls for the implantation of a test energy discharging device 50 in the interior 39 of the casing 35 at the remote end 36 thereof. The apparatus to permit such test energy conduction is shown in FIG. 1. FIG. 3 illustrates the arrangement of the apparatus where no test energy is to be conducted from the remote end of the borehole. Where the test energy to be discharged is electrical, the test energy discharging device may simply be an electrode communicating with the exterior of the casing through the remote end 36 thereof. Where sonic or seismic energy is to be employed, the test energy discharging device can be a suitable sound or compression wave generating device also positioned in the casing communicating with the exterior thereof through its remote end 36. The sound or compression wave generating device can be of any suitable type, several of which are conventionally available, such as a piezoelectric or magnetostrictive transducer. The discharging device is connected to the earth's surface 10 for actuation through an electric conductor 51 extending upwardly through the interior 39 of the casing 35. It is, of course, not necessary that the device be electrically actuated from the earth's surface, but this is preferred for purposes of convenience and control.

The electric conductor 51 is connected to a voltage regulator 52 which in turn is connected to a source of electrical energy 53. Both the voltage regulator and source of electrical energy are located at the earth's surface 10 and, for purposes of convenience, are mounted in a control unit 54.

Where the test energy is to be conducted from the remote end 36 of the casing 35 using the discharging device 50, as above described, detecting and recording or sensing equipment 55, as diagrammatically illustrated in FIG. 2 and somewhat similar to that of applicant Sayer's U.S. Pat. No. 3,805,587, is employed. The equipment includes a plurality of test energy detecting devices 56 disposed on the earth's surface 10. The devices are disposed on the earth's surface in an array extending laterally from the upper end 37 of the casing 35 and are preferably disposed in uniformly spaced relation to form a grid arrangement or disposed along lines intersecting in right-angular relation at the upper end 37 of the casing 35, as shown in FIG. 2.

Where the test energy to be conducted is electrical, the detecting devices 56 are normally electrodes implanted in electrical energy receiving relation at the earth's surface 10. Where the test energy to be conducted is composed of sound or compression waves, the detecting devices can be geophones, receiving transducers, or the like.

The sensing equipment 55 includes a recording device 57 which is mounted for convenience in the control unit 54 at the earth's surface 10. The recording device has a plurality of individual recording units 58 corresponding in number to the detecting devices 56 and which are individually capable of registering and rating the strength of the test energy detected by a detecting device. Each of the recording units mounts a pen 59 which is operable to record minute variations in the strength of the test energy detected by a detecting device 56 to which it is connected. As shown in FIG. 2, a strip chart 60 is transmitted through the recording device 57 and the respective pens of the recording units record the detected variations in the form indicia or lines 61 on the chart. Each recording unit has an adjustment mechanism 62 which is individually operable to control the sensitivity of the unit to the perception of the test energy detected by the detecting device to which it is connected. Electric conductors 63 individually extend from the detecting devices 56 to their reconduction is preferably continued during and after the injection of the test gas into the formation so as to continue to monitor the position, size, concentration and movement, if any, of the test gas within the formation.

During and subsequent to the injection of the test gas into the porous formation 12, the gas, because of its buoyancy, permeates generally upwardly through the porous formation until it is entrapped by an impermeable overlaying structure, such as structure 13, if such is present. If no such structure is present, the gas will simply bleed off through, or be absorbed by, the formation over a period of time and be lost. It is, of course, hoped that the gas will be entrapped by an overlaying structure which can be detected to indicate that the subsurface formation 11 is able to retain gas for purposes of storage. Thus, as shown in FIG. 1, the test gas is injected through the perforations 40 of the casing 35 and permeates the formation laterally of the casing and upwardly until it is entrapped by the cap portion 16 of the overlaying structure 13 to form a test gas cap 90. Conversely, FIG. 3 illustrates a situation in which the borehole 25 has been drilled into the porous formation 12 a considerable distance from the cap portion 16 of the overlaying structure 13. After injection into the porous formation through the perforations 40 of the casing 35, the test gas is caused by its buoyancy to permeate through the porous formation along the upward sloping portion 15 of the overlaying structure 13 toward the cap portion 16 which is a considerable distance from the borehole 25. In this instance, if the porosity of the porous formation 12 is sufficient and the upwardly sloping portions 15 of the overlaying structure 13 are of a sufficient grade, the test gas will permeate through the formation along the interface 14 to form test gas cap 90 remote from the borehole as confined by the cap portion 16.

The specific operation of the equipment 55, 75 and 85 varies, of course, with the equipment and specific techniques employed. In the case of discharging device 50 and sensing equipment 55 where electrical energy is employed, the equipment is set up as previously described and as diagrammatically illustrated in FIG. 2. The voltage regulator 52 is operated to permit the desired voltage electrical current to flow from the source 53 through electrical conductor 51 to the discharging device 50 at the remote end 26 of the borehole 25. The electrical current, indicated for illustrative convenience at 95, is discharged from the discharging device into the earth and conducted by the earth formations away from the discharging device and disbursed in all directions through the earth. The electrical insulation of the casing previously referred to prevents the current from simply being conducted through the casing. It should be noted that the amperage of the current continues to be reduced the farther it is transmitted in any given direction due to the further dispersal of the current and to the natural resistivity of the earth. However, the current which passes through the test gas cap 90 will be reduced even further in amperage by the resistivity of the gas cap. The current reaching the earth's surface 10 is received by the individual detecting devices 56. Depending upon the particular type of detecting devices employed, a signal is produced which is transmitted through the electric conductors 63 to the respective recording units 58 of the recording device 57. The signal can, of course, be amplified, if necessary by any suitable means as long as all the signals are amplified correspondingly. Each recording unit then operates to record on the strip chart 60 through the use of the pen 59 the stength of the signal received from its respective detecting device 56. The strength can be indicated in the amperage of the current detected or any other suitable unit of measure. The operator then calculates the parameters and location of the gas cap from the known position of energy discharge and the known and recorded positions of current detection by the individual detection devices where reduced amperage as a result of passage through the gas cap has been noted.

The method employed in the operation of the discharging device 50 and sensing equipment 55 where the test energy conducted is sonic or seismic in nature is substantially as described in regard to electrical energy. The voltage regulator is operated to deliver current to the discharging device through conductor 51. Depending upon the type of discharging device, sound or compression waves, indicated for illustrative convenience at 105, are discharged through the earth in all directions. The formations to different extents absorb and dissipate the waves, deflect or reflect the waves or otherwise affect the waves transmitted thereagainst. Similarly, those waves passing through the gas cap are affected in a manner which is detectable by comparison with those waves not passing through the gas cap. The detecting devices detect the variations in the waves to produce a signal which is transmitted along the conductors 63 to the recording units 58 for recording as previously described. The operator then calculates the parameters and location of the gas cap from the known position of energy discharge and the known and recorded position of wave detection by the individual detection devices where affected as a result of passage through the gas cap.

It will be seen that where the discharging device 50 and sensing equipment 55 are employed, whether the form of test energy be electrical, sonic, or seismic in nature, this operation should preferably be first performed prior to the injection of the test fluid into the porous formation 12 so that the equipment can be adjusted to produce optimum test data. Thus, the voltage regulator 52 and the adjustment mechanism 62 of each individual recording unit 58 are individually adjusted during this preliminary operation to establish stable readings against which to compare subsequent changes as a result of the formation of the test gas cap. Similarly, it will be apparent that if the currents or waves received by the detecting devices 56 are particularly weak, provision can be made for uniform individual amplification to facilitate recording without disturbing the subsequent analysis.

In the case of the sonic or seismic equipment 75 disposed as previously described at the earth's surface, the operation is somewhat less involved. Where the equipment is of the type herein described for illustrative convenience, the detonating assembly 78 is operated to detonate the explosive charge 77. This produces waves 115 which are transmitted into the earth from the bottom of the borehole 76. The waves encounter discontinuities in the physical properties of the structures encountered and are partially reflected back to the earth's surface. Similarly, the test gas cap 90 in the porous formation 12 partially reflects the waves transmitted thereagainst which are returned to the earth's surface. The waves are then detected and recorded by the sensing devices 79 at the earth's surface 10. The recorded time required for the waves to return indicates the depth of the interface 14, or in other words, the upper surface of the gas cap. Thus, for example, in the illustration of FIG. 3 where the gas cap may travel upwardly in the porous formation along the interface 14 a considerable distance, the depth can be monitored to provide, in effect, a picture of the interface as the gas cap travels therealong.

In the case of temperature recording equipment 85, the test energy is geothermal heat flux, indicated for illustrative convenience at 125, moving upwardly through the earth. The heat flux is heat emanating from the interior of the earth and traveling toward the earth's surface. The gas cap 90 acts as a partial barrier to the heat flux traveling thereagainst. Thus, temperature readings taken by the sensing and recording apparatus 87 at the remote end of the borehole, in comparison with readings taken prior to injection of the test gas into the formation, disclose the location, size, concentration and movement of the test gas cap.

Figure 4:
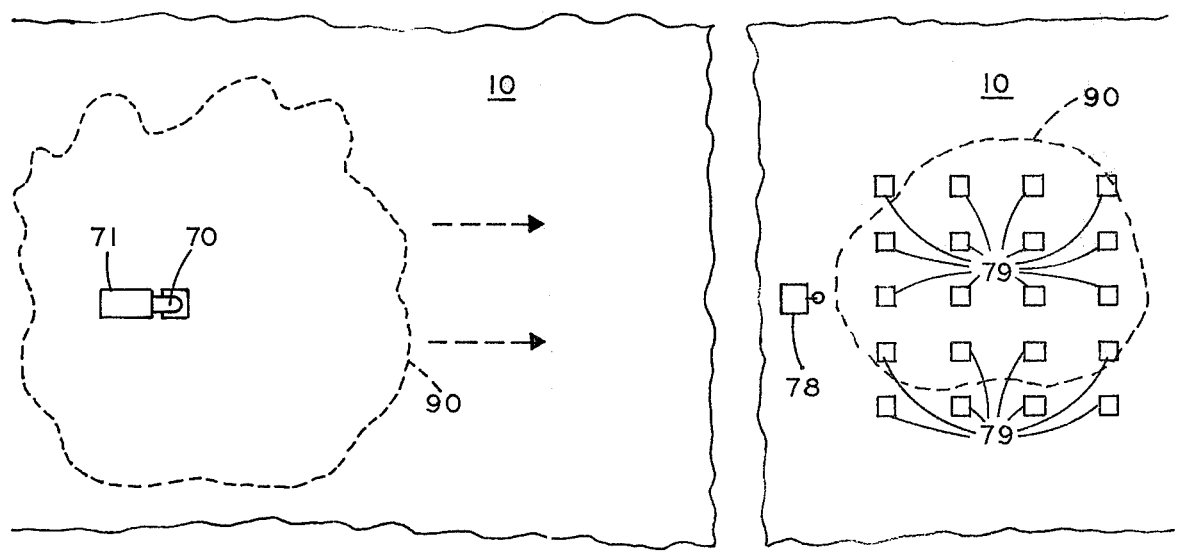
FIG. 4 is a fragmentary top plan view of the earth showing the apparatus of the present invention mounted therein in the same arrangement and under the same conditions as shown in FIG. 3.

It will be seen that where the construction of the porous formation 12 and impervious overlaying structure 13 is such that the test gas cap 90 is caused to move along the interface 14 and thus forms a final test gas cap at a position remote from the borehole, such as illustrated in FIGS. 3 and 4, the usage of the discharging device 50 and the sensing equipment 52 is of somewhat limited value. This is because, if location of the test gas cap is a considerable distance from the borehole 25, the test energy 95 and 105 will be unlikely to indicate the location of the gas cap, although continued use after injection would indicate movement in the direction of actual movement of the test gas. However, the use of the sonic or seismic equipment 75 and/or the temperature recording equipment permits the movement of the test gas to be monitored over a period of time and at any distance from the borehole. Thus, as indicated in FIG. 4, the movement of the sensing devices 79 following the movement of the test gas cap will allow the operators to monitor the movement of the test gas cap to the location of the cap portion 16 of the overlaying structure 13. This location would then normally be the appropriate location for the drilling of a new borehole for the purposes of injecting natural gas into the formation for storage. As can be seen in FIG. 4, the arrangement of the sensing devices 79 in a grid pattern will indicate the position and dimensions of the test gas cap for this purpose.

Thus, in the practice of the method of the present invention utilizing the apparatus hereof, the test energy, such as 95, 105, 115 and 125, is conducted through the earth and affected in a detectable manner by the test gas cap 90. That test energy so affected is then detected and recorded for purposes of analysis in monitoring the position, size, concentration, and movement of the test gas cap. If the test gas cap fails to form or simply bleeds off into surrounding formations over a period of time, the operator is accordingly informed that the porous formation 12 under investigation is not suitable for use in the storage of natural gas or a similar fluid. However, if the test gas cap 90 is formed and continues to be present over a prolonged period of time, as indicated by continued testing, the operator is thereby informed that the porous formation 12 is suitable for the storage of natural gas.

Where this determination of suitability is made, the natural gas is then simply pumped downwardly into the porous formation and through the perforations 40 of the casing 35 in the conventional manner and retained in position by the impervious overlaying structure 13 until needed. When needed, the natural gas is pumped upwardly in the casing through the perforations 40 thereof and again recovered at the earth's surface 10 for use. As mentioned, in the case of the example of FIG. 3, depending upon the distance between the borehole 25 and the position at which the test gas cap actually forms, it may be more practical to drill a new borehole at that position for purposes of the injection into and extraction from the porous formation of the natural gas.

Therefore, the method and apparatus of the present invention are capable of use in the testing and evaluating of subsurface formations for fluid retention potential and are particularly well suited to the analysis of such formations for their suitability in the storage of large quantities of natural gas with a reliability and efficiency making, for the first time, such subsurface storage of natural gas economically feasible.

Although the invention has been shown and described in what is conceived to be the most practical and preferred method and apparatus, it is recognized that departures may be made therefrom within the scope of the invention, which is not to be limited to the illustrative details disclosed.

Having described our invention, what we claim as new and desire to secure by Letters Patent is:

1. A method for testing a subsurface formation for fluid retention potential, comprising the steps of:
    forming a borehole leading into communication with the formation;
    inserting a buoyant fluid into the formation through the borehole laterally thereof; and
    conducting test energy, affected by contact with said fluid, through the formation laterally of the borehole to determine the location and concentration of the fluid within the formation by determination of the test energy affected by contact with said fluid.

2. The method of claim 1 wherein the conducting step includes conducting seismic energy from the earth's surface through the formation and sensing the seismic energy reflected by the fluid within the formation to determine the location and concentration thereof.

3. The method of claim 1 wherein the borehole is formed so as to extend a predetermined distance into the formation to a remote end, the fluid is a gas inserted into the formation between the remote end of the borehole and the earth's surface and the conducting step includes conducting test energy from said remote end of the borehole to the surface through and about the gas and sensing the test energy affected by the gas to determine the location and concentration thereof.

4. The method of claim 3 wherein the test energy is electrical and subject to detectable alteration by conduction through said gas.

5. The method of claim 3 wherein the test energy is seismic and subject to detectable alteration by conduction through said gas.

6. The method of claim 3 wherein the test energy is sonic and subject to detectable alteration by conduction through said gas.

7. A method for locating a subsurface formation suitable for storage of natural gas, and the like comprising:

A. locating a porous formation below the earth's surface appearing to possess a structure suitable for gas storage;
B. boring a hole from the earth's surface into said formation;
C. logging the borehole to determine the location of the porous formation;
D. mounting a casing in the borehole;
E. perforating the casing at the location of said formation;
F. pressurizing the interior of the casing with a gas to force said gas through the perforations in the casing and into the formation;
G. discharging test energy, reflectable by said gas, from the earth's surface into the formation over a predetermined period of time;
H. detecting at the earth's surface during said period of time the test energy reflected by the gas to determine the size and location of the gas within the formation; and
I. recording the detected energy for analysis of the gas retention potential of the formation.

8. A method of exploring a subsurface geological formation comprising:
A. conducting test energy through the formation along a predetermined path;
B. measuring the extent of such conduction;
C. injecting a test fluid into the formation in proximity to the path to permeate the formation having conducting characteristics for said energy distinct from those of the formation;
D. again conducting said test energy along the path;
E. again measuring the extent of such conduction; and
F. collating the measured conductions to determine penetration of the fluid to the path;
G. determining the fluid retention potential of the formation.

9. The method of claim 8 including again conducting said test energy along the path after a lapse of time, again measuring the extent of such conduction, and collating the last measured extent of such conduction with the earlier measured extent to detect fluid leakage.

10. A method for testing a subsurface formation for fluid retention potential, where energy is passed through the formation, comprising the steps of:
inserting a test fluid into the formation in the path of the energy passing through the formation, said test fluid having properties of mobility corresponding to those of the fluid to be retained and properties affecting said energy passing through the formation;
detecting the energy affected by the test fluid during passage through the formation; and
determining the location and concentration of the test fluid within the formation from said detecting of the energy affected.

11. The method of claim 10 including the step of:
permitting the test gas to travel by said properties of mobility over a time interval between the inserting and detecting steps.

12. The method of claim 11 wherein the test fluid is a gas having properties of buoyancy within the formation limited only by impervious structures overlaying the formation.

* * * * *

UNITED STATES PATENT AND TRADEMARK OFFICE
CERTIFICATE OF CORRECTION

PATENT NO. : 4,009,609
DATED : March 1, 1977
INVENTOR(S) : Wayne L. Sayer and Pat Wright It is certified that error appears in the above-identified patent and that said Letters Patent are hereby corrected as shown below:

Column 1, Line 23, delete "3,711,360" and insert --- 3,771,360 ---.

Column 3, Line 63, delete "overlying" and insert --- overlaying ---.

Column 8, Line 11, between "the" and "ambient" insert --- effect of ---.

Column 9, Line 19, after "permeates" insert --- through ---.

Column 10, Line 3, delete "stength" and insert --- strength ---.

Signed and Sealed this

Fourteenth Day of June 1977

[SEAL]

*Attest:*

RUTH C. MASON
*Attesting Officer*

C. MARSHALL DANN
*Commissioner of Patents and Trademarks*